(12) United States Patent
Uchikado

(10) Patent No.: US 8,210,092 B2
(45) Date of Patent: Jul. 3, 2012

(54) FLUID MACHINE

(75) Inventor: Iwao Uchikado, Isesaki (JP)

(73) Assignee: Sanden Corporation, Isesaki (JP)

( * ) Notice: Subject to any disclaimer, the term of this patent is extended or adjusted under 35 U.S.C. 154(b) by 795 days.

(21) Appl. No.: 12/303,354

(22) PCT Filed: Jun. 4, 2007

(86) PCT No.: PCT/JP2007/061302
§ 371 (c)(1),
(2), (4) Date: Dec. 3, 2008

(87) PCT Pub. No.: WO2007/142198
PCT Pub. Date: Dec. 13, 2007

(65) Prior Publication Data
US 2009/0199809 A1  Aug. 13, 2009

(30) Foreign Application Priority Data

Jun. 7, 2006  (JP) .................................. 2006-158462

(51) Int. Cl.
*F04B 39/00* (2006.01)
*F16J 9/22* (2006.01)
(52) U.S. Cl. ..................................... 92/223; 29/888.048
(58) Field of Classification Search .................... 92/172, 92/223; 29/888.048, 888.049
See application file for complete search history.

(56) References Cited

U.S. PATENT DOCUMENTS

| | | | | | |
|---|---|---|---|---|---|
| 4,987,865 | A | * | 1/1991 | Schenkel | 92/223 |
| 5,158,052 | A | * | 10/1992 | Yoshimura | 92/223 |
| 5,469,777 | A | * | 11/1995 | Rao et al. | 92/223 |
| 5,941,161 | A | * | 8/1999 | Kimura et al. | 92/175 |

FOREIGN PATENT DOCUMENTS

| | | | |
|---|---|---|---|
| EP | 1 264 987 | | 12/2002 |
| GB | 2 290 598 | | 1/1996 |
| GB | 2290598 A | * | 1/1996 |
| JP | 54-30519 | | 3/1979 |
| JP | 54030519 A | * | 3/1979 |
| JP | 95484/1982 | | 6/1982 |
| JP | 123781/1988 | | 8/1988 |
| JP | 10-169557 | | 6/1998 |
| JP | 11-201038 | | 7/1999 |

* cited by examiner

*Primary Examiner* — Thomas E Lazo
(74) *Attorney, Agent, or Firm* — Cozen O'Connor

(57) ABSTRACT

A reciprocating fluid machine (2) includes pistons (32) reciprocated in respective cylinder bores (40). Each piston includes, as a lateral surface (32*a*) thereof, a cylindrical section (64) disposed in sliding contact with the corresponding cylinder bore with a coating layer (66) therebetween, ring groove sections (68) fitted with respective piston rings (34), and tapered sections (70) each formed between the cylindrical section and the corresponding ring groove section and inclined from the cylindrical section toward the ring groove section so as to be gradually set apart from the cylinder bore. The coating layer is also formed on each tapered section in such a manner as to be gradually set apart from the cylinder bore.

4 Claims, 5 Drawing Sheets

FLUID MACHINE

RELATED APPLICATIONS

This is a U.S. National Phase Application under 35 USC 371 of International Application PCT/JP2007/061302 filed on Jun. 4, 2007.

This application claims the priority of Japanese patent application no. 2006-158462 filed Jun. 7, 2006, the content of which is hereby incorporated by reference.

TECHNICAL FIELD

The present invention relates to pistons, reciprocating fluid machines using pistons, and methods of manufacturing pistons. More particularly, the present invention relates to a piston suited for use in an automotive air conditioner applied to a refrigeration cycle using $CO_2$ as a refrigerant, a reciprocating fluid machine using such pistons, and a method of manufacturing the piston.

BACKGROUND ART

In recent years, reciprocating fluid machines of this type have become smaller in size and weight. Especially in the case of fluid machines applied to refrigeration cycles using $CO_2$ as their refrigerant, the discharge capacity may be small, compared with conventional fluid machines using a fluorocarbon-based refrigerant, and therefore, pistons used in such machines can be significantly reduced in their length along the reciprocating direction. If the size and weight of the fluid machine are reduced, however, side force applied to the side or lateral surface of the piston increases with decrease in the piston length. As a result, the lateral surface of the piston or the inner surface of the cylinder bore wears quickly, lowering the durability of the fluid machine.

To overcome the drawback, a technique has been proposed wherein a Teflon (registered trademark)-based coating layer, for example, is formed over the lateral surface of the piston, an annular ring groove is cut in the lateral surface of the piston coated with the coating layer, and a Teflon-based piston ring is fitted in the ring groove, thereby enhancing the slidability of the piston within the cylinder bore (cf. Unexamined Japanese Patent Publication No. H10-169557).

However, where the piston thus coated with the coating layer is applied to a refrigeration cycle using $CO_2$ as the refrigerant, a problem arises in that the coating layer peels off. This is because the working pressure of the $CO_2$ refrigerant is approximately seven to ten times higher than that of a fluorocarbon-based refrigerant, for example, R134a refrigerant, with the result that the coating layer is drawn with an increased force in the reciprocating direction of the piston.

Particularly, in the case of the piston disclosed in the above publication, the ring groove to be fitted with the piston ring is formed in the grooving step following the coating step of forming the coating layer and the grinding step of uniformly grinding the coating layer. Thus, the ring groove is formed by cutting the coating layer apart, so that the coating layer is liable to peel off from its cut edges while the piston is reciprocating. If the coating layer easily peels off, the lateral surface of the piston or the inner surface of the cylinder bore wears after all, as in the case where the piston has no coating layer formed thereon, resulting in lowering in the durability of the piston, and thus of the fluid machine.

As a conceivable measure, the coating layer may be formed inside the ring groove as well. To coat the ring groove with the coating layer, however, the coating step needs to be again performed following the grooving step. Further, in order to ensure the required fitting accuracy of the piston ring, it is necessary that the coating layer formed inside the ring groove should be ground. In this case, therefore, the piston manufacturing process must be drastically modified, requiring alteration of the piston production facilities and thus entailing increase in cost.

It is also conceivable that a coating material with high coating strength may be used for the coating layer so that the coating layer may not easily peel off. Such a coating material is, however, expensive, eventually leading to increase in the cost of the fluid machine.

DISCLOSURE OF THE INVENTION

The present invention was created in view of the above circumstances, and an object thereof is to provide a piston, peeling of the coating layer of which can be prevented at low cost, thereby improving the durability of the piston, a reciprocating fluid machine using such pistons, and a method of manufacturing the piston.

To achieve the object, the present invention provides a reciprocating fluid machine having pistons reciprocated in respective cylinder bores, wherein each of the pistons includes, as a lateral surface thereof, a cylindrical section disposed in sliding contact with the corresponding cylinder bore with a coating layer therebetween, a ring groove section fitted with a piston ring, and tapered sections each formed between the cylindrical section and the ring groove section and inclined from the cylindrical section toward the ring groove section so as to be gradually set apart from the cylinder bore, and wherein the coating layer is formed on the tapered sections in such a manner as to be gradually set apart from the cylinder bore.

Also, to achieve the above object, the present invention provides a piston for reciprocating in a cylinder bore, wherein the piston includes, as a lateral surface thereof, a cylindrical section disposed in sliding contact with the cylinder bore with a coating layer therebetween, a ring groove section fitted with a piston ring, and tapered sections each formed between the cylindrical section and the ring groove section and inclined from the cylindrical section toward the ring groove section so as to be gradually set apart from the cylinder bore, and wherein a coating layer is formed on each of the tapered sections in such a manner as to be gradually set apart from the cylinder bore.

In the piston and the reciprocating fluid machine according to the present invention, the lateral surface of the piston has the tapered sections each formed between the cylindrical section and the ring groove section and covered with the coating layer. Each tapered section is inclined from the cylindrical section toward the ring groove section so as to be gradually set apart from the cylinder bore. Accordingly, the tapered sections do not come into direct contact with the cylinder bore, and the coating layer covering each tapered section is prevented from peeling off, making it possible to enhance the durability of the reciprocating fluid machine or of the piston at low cost without the need to use a coating material with high coating strength.

Further, to achieve the above object, the present invention provides a method of manufacturing a piston for reciprocating in a cylinder bore. The method comprises the steps of: forming, on a lateral surface of the piston, a cylindrical section disposed in sliding contact with the cylinder bore, and tapered sections inclined from the cylindrical section toward an axis of the piston so as to be gradually set apart from the cylinder bore; forming a coating layer over the cylindrical section as well as over the tapered sections such that the coating layer coated on each of the tapered sections is gradually set apart from the cylinder bore; and cutting part of each of the tapered sections covered with the coating layer inclined so as to be gradually set apart from the cylinder bore, to form a ring groove section to be fitted with a piston ring.

In the piston manufacturing method, the tapered sections, which are inclined so as to be gradually set apart from the cylinder bore, are also formed in the step of forming the cylindrical section on the lateral surface of the piston. Thus, the subsequent steps, namely, the step of forming the coating layer on the piston and the step of cutting the ring groove section, need not be modified and may be performed in the same manner as those of the conventional manufacturing method. It is therefore possible to manufacture the piston with enhanced durability at low cost without the need to alter the piston production facilities.

Preferably, in the piston manufacturing method, the tapered sections are formed by cutting.

In this case, the piston with the tapered sections can be easily obtained by subjecting a conventional piston with no tapered sections to cutting to form the tapered sections. Thus, the piston with enhanced durability can be obtained at low cost.

In the piston manufacturing method, the tapered sections are preferably formed by forging or press forging.

Where the tapered sections are formed by forging or press forging, the piston can be manufactured in large amounts at lower cost, whereby both the productivity and durability of the piston can be improved.

Preferably, in the piston manufacturing method, the tapered sections are formed by casting.

Where the tapered sections are formed by casting, the piston can be manufactured in large amounts at very low cost, whereby the productivity and durability of the piston can be remarkably improved.

BEST MODE OF CARRYING OUT THE INVENTION

Figure 1:
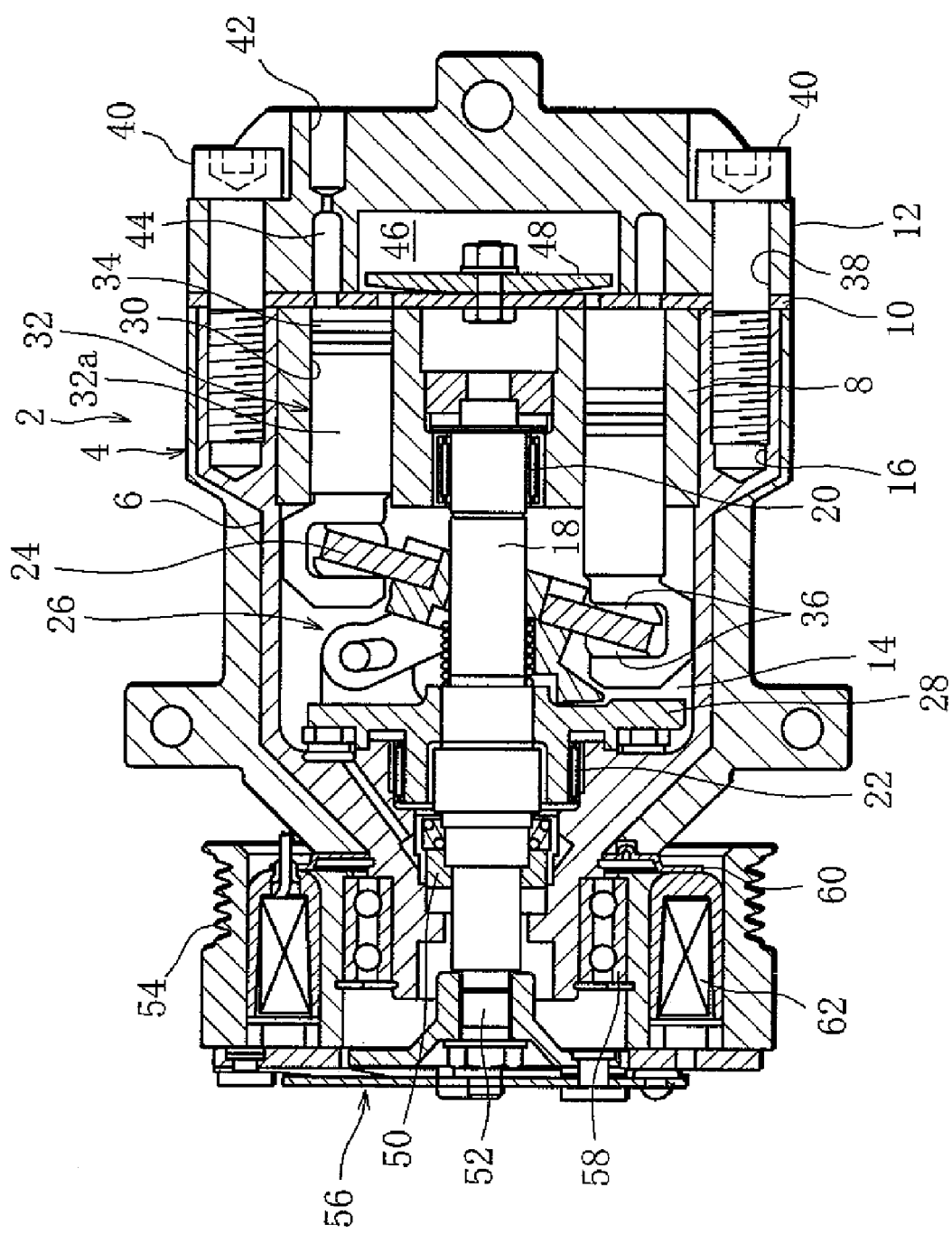
FIG. 1 is a longitudinal sectional view of a fluid machine of an embodiment of the invention, applied to a refrigeration circuit.

FIG. 1 shows a variable-capacity swash plate compressor 2 according to one embodiment of the present invention. The compressor 2 is applied, for example, to a refrigeration circuit using $CO_2$ as a refrigerant and constituting an air conditioner for a motor vehicle. The refrigeration circuit includes a circulation path (not shown) for circulating the $CO_2$ refrigerant therethrough. The compressor 2, a gas cooler (not shown), an expansion valve (not shown) and an evaporator (not shown) are inserted in the circulation path in order. The refrigerant compressed by the compressor 2 is delivered to the gas cooler to be circulated through the circulation path.

The compressor 2 has a housing 4 containing a cylindrical casing 6. The casing 6 is open at both ends and has a cylindrical cylinder block 8 fitted in its inner peripheral surface. A cylinder head 12 is attached to one end of the cylinder block 8 with a valve plate 10 therebetween, and a crank chamber 14 is defined close to the other end of the cylinder block 8. A plurality of axial holes 16 are formed in the part of the casing 6 surrounding the cylinder block 8 and open in the outer end face of the casing 6 close to the valve plate 10. A female thread is cut in the inner peripheral surface of each axial hole 16.

A rotary shaft 18 is arranged in the casing 6 and extends through the crank chamber 14 in the axial direction. The rotary shaft 18 is rotatably supported by the cylinder block 8 and the casing 6 with respective bearings 20 and 22 therebetween.

Also, an annular swash plate 24 surrounding the rotary shaft 18 is arranged in the crank chamber 14 and coupled to the rotary shaft 18 by means of a tilting unit 26. Accordingly, the swash plate 24 is rotatable together with the rotary shaft 18 and is also tiltable relative to the rotary shaft 18. The tilting unit 26 includes a rotor 28 rotatable together with the rotary shaft 18, and the bearing 22 for the rotary shaft 18 is, in reality, interposed between the outer peripheral surface of the cylindrical part of the rotor 28 and the inner peripheral surface of the casing 6.

The cylinder block 8 has a plurality of cylinder bores 30 formed therethrough and arranged circumferentially around the axis of the rotary shaft 18. Each cylinder bore 30 extends parallel to the rotary shaft 18, and a piston 32, described in detail later, is slidably inserted into each cylinder bore 30 from the crank chamber side. Two C-shaped piston rings 34 are fitted around the cylindrical lateral surface 32a of each piston 32. The piston 32 has an end portion projecting into the crank chamber 14, and a recess opening toward the rotary shaft 18 is formed in the end portion of the piston 32. The recess has spherical seats formed in its inner surface, and a pair of semispherical shoes 36 are received in the respective spherical seats. The shoes 36 slidably hold the outer peripheral edge of the swash plate 24 from opposite sides of same in the thickness direction.

The cylinder head 12 is airtightly fixed to the end of the casing 6 close to the bearing 20, with a gasket (not shown) and the valve plate 10 therebetween. Specifically, the cylinder head 12, which forms part of the housing 4, the gasket and the valve plate 10 individually have bolt holes 38 formed therein in alignment with the respective axial holes 16, and tap bolts 40 are respectively inserted into the bolt holes 38 and screwed into the axial holes 16, thereby fastening the cylinder head 12 to the casing 6.

A suction port 42 and a discharge port (not shown), both connected to the aforementioned circulation path, are formed in the outer end wall of the cylinder head 12. Also, a suction chamber 44 and a discharge chamber 46 are defined inside the cylinder head 12 in communication with the suction port 42 and the discharge port, respectively. Further, a solenoid-operated control valve (not shown) is disposed inside the cylinder head 12. The solenoid-operated control valve opens/closes a pressure regulation flow channel (not shown) connecting between the discharge chamber 46 and the crank chamber 14 when the solenoid thereof is energized/de-energized.

The suction chamber 44 can communicate with the cylinder bores 30 through respective suction reed valves (not shown) and also communicates at all times with the crank chamber 14 through a fixed orifice (not shown) formed through the valve plate 10. The discharge chamber 46 can communicate with the cylinder bores 30 through respective discharge reed valves each comprising a reed valve element (not shown) and a valve stopper 48.

The rotary shaft 18 has an end portion 52 projecting outward from the casing 6 through a mechanical seal 50. An electromagnetic clutch 56 with a pulley 54 is coupled to the end portion 52 of the rotary shaft 18 and is rotatably supported by the casing 6 with a bearing 58 therebetween. A solenoid 62 of the electromagnetic clutch 56 is, however, fixed to the casing 6 by means of an annular bracket 60 securely fitted around the end portion of the casing 6. As the solenoid 62 is energized and de-energized, the electromagnetic clutch 56 intermittently transmits motive power from an engine (not shown) or the like to the rotary shaft 18.

When the electromagnetic clutch 56 is operated, the motive power from the engine or the like is transmitted to the rotary shaft 18 through the electromagnetic clutch 56, so that the rotary shaft 18 rotates. Rotating motion of the rotary shaft 18 is converted to reciprocating motion of each piston 32 by the swash plate 24. Because of the reciprocating motion, each piston 32 performs a series of processes including a suction process in which the refrigerant in the suction chamber 44 is drawn into the corresponding cylinder bore 30 through the suction reed valve, a compression process in which the refrigerant is compressed in the cylinder bore 30, and a discharge process in which the compressed refrigerant is discharged into the discharge chamber 46 through the corresponding discharge reed valve. The discharge quantity of the refrigerant delivered from the compressor 2 is adjusted by switching on/off the aforementioned solenoid-operated control valve to open/close the pressure regulation flow channel. Specifically, the flow channel is opened/closed to control the pressure (back pressure) in the crank chamber 14, thereby varying the stroke length of the pistons 32.

Figure 6:
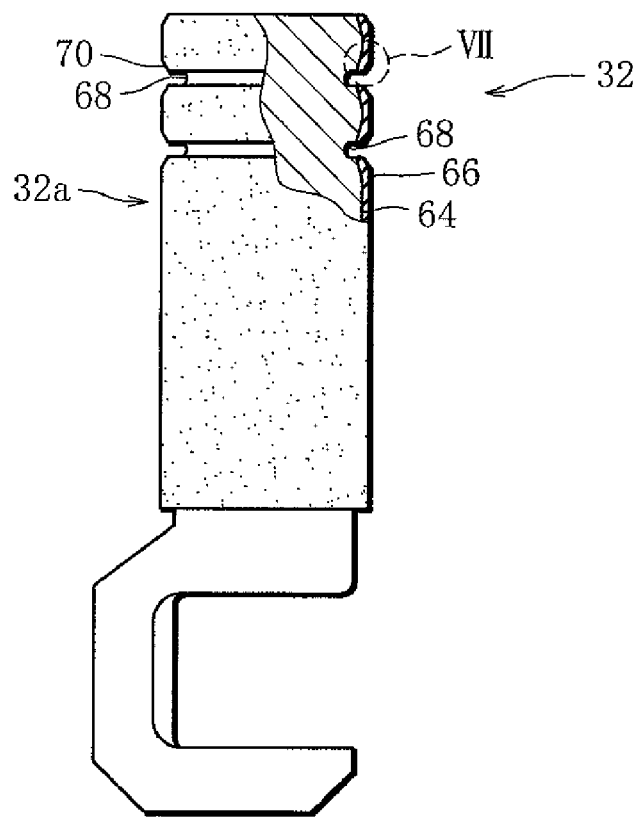
FIG. 6 is an enlarged view of the piston in FIG. 1, showing the shape of the piston after a grooving step.

Referring now to FIG. 6, the piston 32 will be explained in detail. Each piston 32 has a cylindrical section 64 forming its lateral surface 32a. A coating layer 66 of a fluorine-based resin containing PTFE (polytetrafluoroethylene) as its main component, or what is called Teflon (registered trademark), is formed over substantially the entire area of the cylindrical section 64. The outer diameter of the cylindrical section 64 including the thickness of the coating layer 66 is almost equal to the inner diameter of the cylinder bore 30, and the cylindrical section 64 comes into sliding contact with the inner surface of the cylinder bore 30 with the coating layer 66 therebetween.

Two ring groove sections 68 are formed in the lateral surface 32a along the circumference of the cylindrical section 64. Each ring groove section 68 is fitted with the piston ring 34 shown in FIG. 1. The piston rings 34 fill up the clearance between the lateral surface 32a of the piston 32 and the inner surface of the cylinder bore 30 and also serve to improve slidability of the piston 32 as well as sealability of the compressed gas within the cylinder bore 30.

Figure 7:
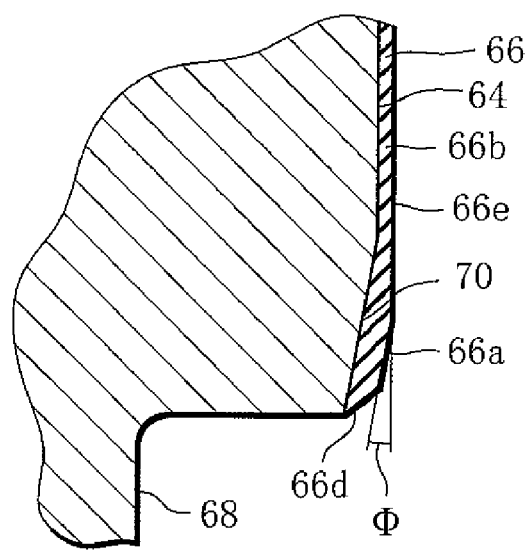
FIG. 7 is an enlarged view of part VII shown in FIG. 6.

As shown in detail in FIG. 7, a tapered section 70 is formed between the cylindrical section 64 and the ring groove section 68 so as to incline from the cylindrical section 64 toward the ring groove section 68. The tapered section 70 is inclined from the cylindrical section 64 toward the axis of the piston 32 at an angle Φ. In other words, the tapered section 70 extends in a direction such that when the piston 32 is inserted in the cylinder bore 30, the tapered section 70 becomes gradually set from the cylinder bore 30 at a predetermined rate corresponding to the angle Φ. Further, the coating layer 66 covering the cylindrical section 64 extends up to the tapered section 70, and the coating layer 66 covering the tapered section 70 also becomes gradually set apart from the cylinder bore 30 at substantially the same rate as that of the tapered section 70.

The process for manufacturing the piston 32 will be now described with reference to FIGS. 2 to 5.

Figure 2:
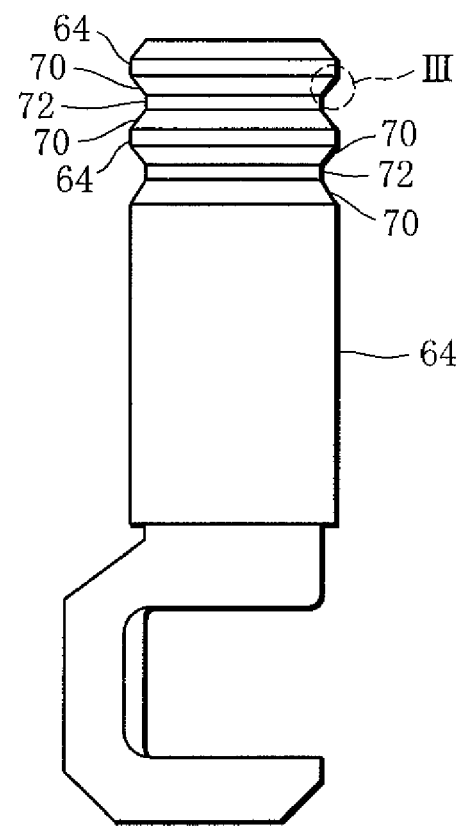
FIG. 2 shows the shape of a piston in FIG. 1 after a primary working step.

First, in the primary working step of the piston 32, the cylindrical section 64 and the tapered sections 70 are formed, as shown in FIG. 2. The tapered sections 70 are formed at respective predetermined positions where the ring groove sections 68 are to be formed in such a manner that the adjacent tapered sections 70 inclined toward the axis of the piston 32 face each other. The tapered sections 70 are each formed as a slope continuous with a corresponding small-diameter cylindrical section 72 having a diameter smaller than that of the cylindrical section 64.

Figure 3:
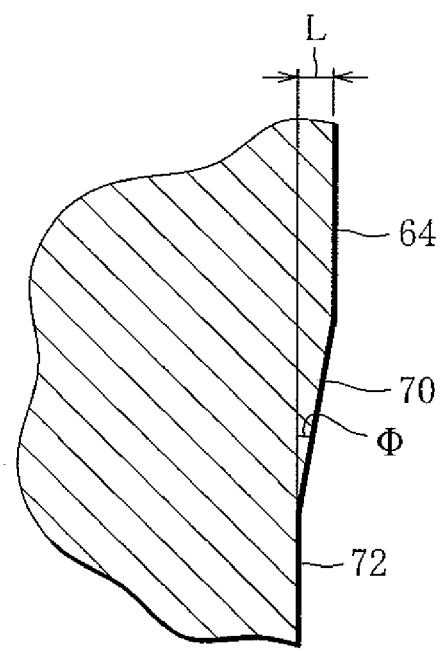
FIG. 3 is an enlarged view of part III shown in FIG. 2.

Specifically, as shown in FIG. 3, the radius of the small-diameter cylindrical section 72 is smaller than that of the cylindrical section 64 by a predetermined length L determined by the inclination angle Φ of the tapered section 70. The length L is set to a value that permits the coating layer 66 with a substantially uniform thickness to be simultaneously formed over the cylindrical section 64, the tapered sections 70 and the small-diameter cylindrical sections 72 in the subsequent coating step, described below. For example, the length L is set to about 0.2 mm. The piston 32 with the illustrated shape can be obtained by subjecting a piston with a conventional shape having no tapered sections to cutting. Where the piston 32 is to be produced anew, on the other hand, the piston may be formed by forging or press forging, preferably by casting.

Figure 4:
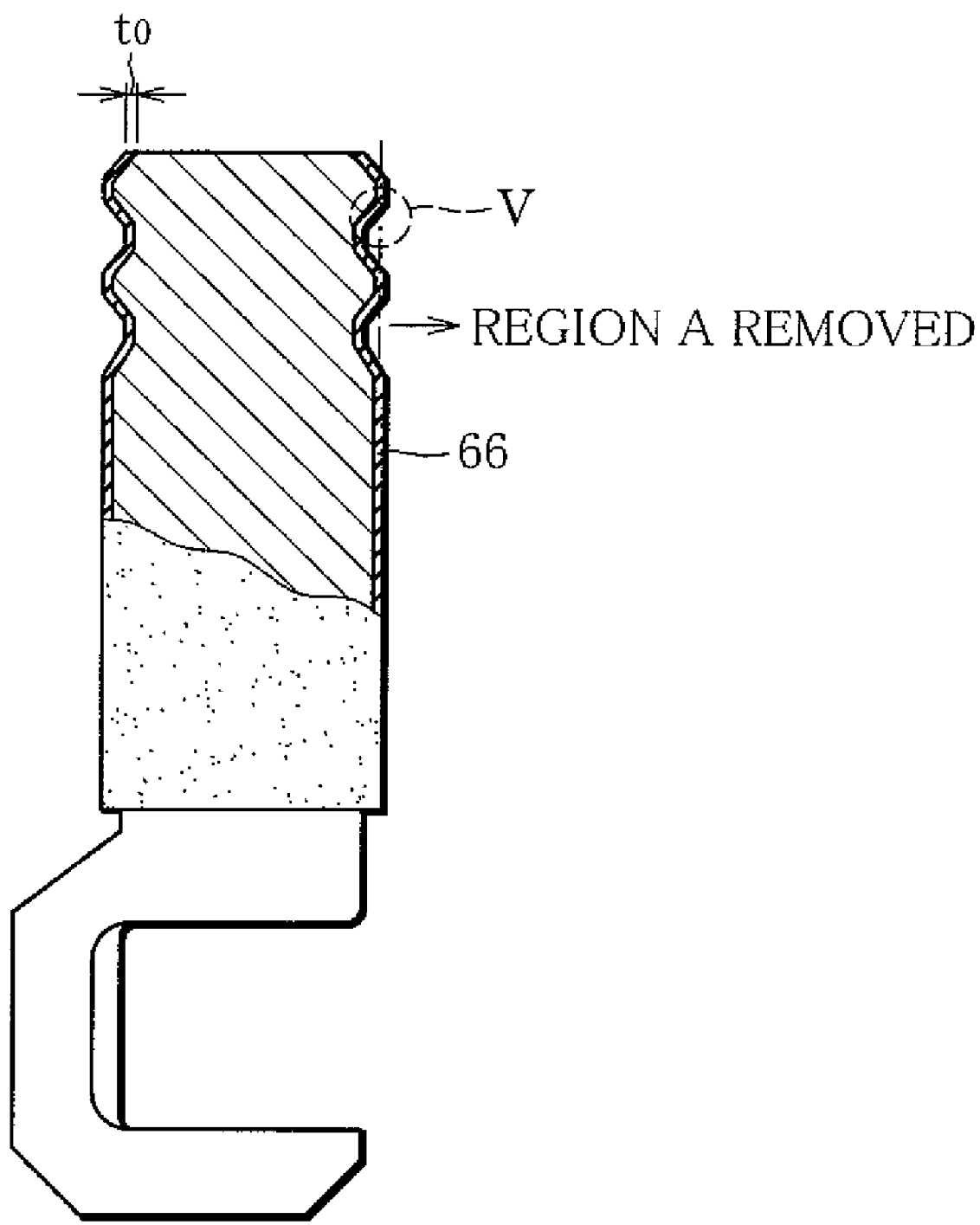
FIG. 4 shows the shape of the piston in FIG. 1 after a coating step and before a grinding step.

Subsequently, in the coating step, the coating layer 66 with a substantially uniform thickness to is formed continuously over the cylindrical section 64, tapered sections 70 and small-diameter cylindrical sections 72 of the piston 32, as shown in FIG. 4. Since the thickness to of the coating layer 66 is uniform, portions of the coating layer 66 covering the respective tapered sections 70 are also inclined toward the axis of the piston 32 so as to be gradually set apart from the cylinder bore 30, as mentioned above.

Figure 5:
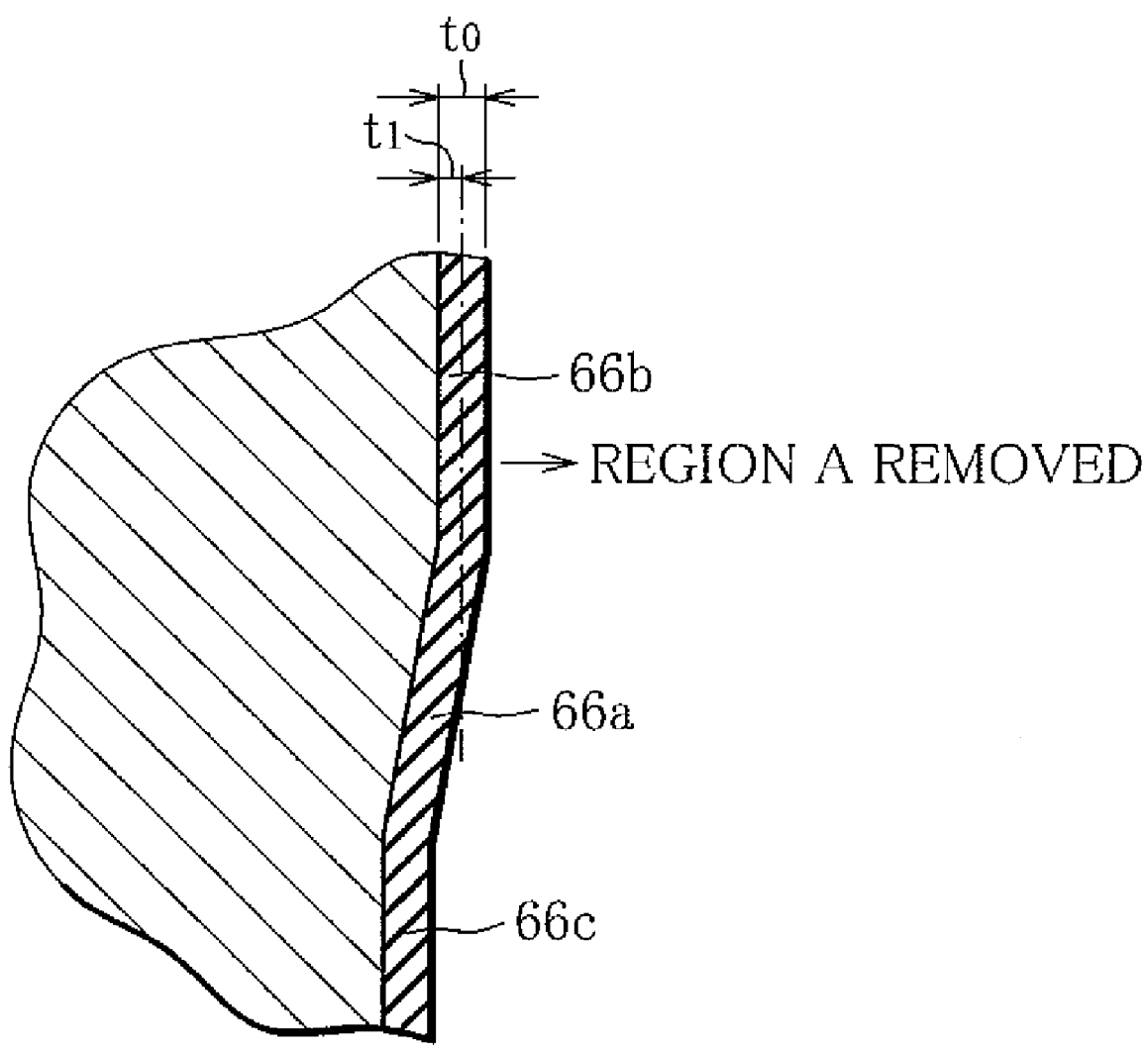
FIG. 5 is an enlarged view of part V shown in FIG. 4.

The piston 32 is then subjected to grinding, and in the grinding step, only a radially outward region A of the coating layer 66, shown in FIG. 4, is ground and removed. Specifically, as shown in FIG. 5, the coating layer 66 covering the cylindrical section 64 and portions of the tapered sections 70 is ground until the thickness thereof is reduced to a predetermined thickness $t_1$ that permits the piston 32 to smoothly slide within the cylinder bore 30, thus forming a ground coating portion 66b. On the other hand, portions of the coating layer 66 covering the remaining portions of the tapered sections 70 and the small-diameter cylindrical sections 72 are not ground (not reduced in thickness) at all and remain respectively as tapered coating portions 66a inclined along the tapered sections 70 and radially inward coating portions 66c located closer to the axis of the piston 32 than the ground coating portion 66b.

Referring again to FIGS. 6 and 7, a grooving step will be explained in which the ring groove sections 68 are cut in the piston 32. In the grooving step, the ring groove sections 68 are formed while leaving part of the tapered sections 70. Specifically, the small-diameter cylindrical sections 72 having the radially inward coating portions 66c coated thereon and their peripheral portions are removed in such a manner that the tapered coating portions 66a of the coating layer 66 are partly left. At this time, edges 66d of the coating layer 66, which are the remainders of the tapered coating portions 66a, are chamfered, and thus the edges 66d are located closer to the axis of the piston 32 than the surface 66e of the ground coating portion 66b covering the cylindrical section 64. In this manner, the cylindrical section 64, tapered sections 70 and small-diameter cylindrical sections 72 of the piston 32 are formed in the primary working step, and then the coating layer 66 is formed in the coating step. Subsequently, in the grinding step, the coating layer 66 is ground except for the tapered coating portions 66a and the radially inward coating portions 66c, to form the ground coating portion 66b, and in the final grooving step, the radially inward coating portions 66c, inclusive of part of the tapered coating portions 66a, are removed to form the ring groove sections 68.

Thus, in the piston 32 according to the embodiment, each tapered section 70 is located between the cylindrical section 64 and the corresponding ring groove section 68, and the tapered section 70 is inclined from the cylindrical section 64 toward the ring groove section 68 so as to be gradually set apart from the cylinder bore 30. Each tapered coating portion 66a of the coating layer 66 is also inclined so as to be gradually set apart from the cylinder bore 30, and the edges 66d of the coating layer 66 are located closer to the axis of the piston 32 than the surface 66e of the ground coating portion 66b. Consequently, the tapered coating portions 66a including the edges 66d do not come into direct contact with the cylinder bore 30, whereby the coating layer 66 is prevented from peeling off. It is therefore possible to improve the durability of the piston 32, and thus of the compressor 2, at low cost without the need to use a coating material with high coating strength.

Also, the tapered coating portions 66a are not ground and thus are large in thickness, compared with the ground coating portion 66b. Accordingly, the tapered coating portions 66a including the edges 66d, where peeling of the coating layer 66 is liable to occur first, have increased coating strength, making it possible to further enhance the durability of the piston 32, and thus of the compressor 2.

Moreover, in the manufacturing process of the piston 32, the cylindrical section 64 as well as the tapered sections 70 are formed in the primary working step. Accordingly, the subsequent coating and grooving steps of the piston manufacturing process can be performed in the same manner as in the process for manufacturing conventional pistons with no tapered sections, making it possible to manufacture the piston 32 with enhanced durability at low cost without the need to alter the production facilities.

Also, where the tapered sections 70 are formed by cutting, the piston 32 can be obtained with ease by using a conventional piston, making it possible to manufacture the piston 32 with enhanced durability at lower cost.

Where the tapered sections 70 are formed by forging or press forging, on the other hand, it is possible to manufacture the piston 32 in large amounts at low cost, compared with the case where the tapered sections 70 are formed by cutting. Preferably, the tapered sections 70 are formed by casting. In this case, although initial investment is required to make molds for the piston 32, the piston 32 can be manufactured in large amounts at very low cost in the long run, whereby both the durability and productivity of the piston 32 can be improved to a large extent.

While the embodiment of the present invention has been described above, it is to be noted that the present invention is not limited to the foregoing embodiment alone and may be modified in various ways without departing from the spirit and scope of the invention.

For example, in the above embodiment, each ring groove section 68 is formed by removing the small-diameter cylindrical section 72, inclusive of the radially inward coating portion 66c, and its peripheral portion such that the tapered coating portions 66a of the coating layer 66 are partly left. Since the edges 66d of the coating layer 66 have only to be located closer to the axis of the piston 32 than the surface 66e of the ground coating portion 66b, part of the small-diameter cylindrical section 72 may also be left uncut. Also in this case, the coating layer 66 is prevented from peeling off, and the above advantages can be achieved.

In the foregoing embodiment, moreover, a fluorine-based resin containing PTFE as its main component is used as the coating material forming the coating layer 66, but the coating material to be used is not limited to such a fluorine-based resin. A fluorine-based resin containing PTFE as its main component is, however, preferred because the coating layer 66 formed using the resin has excellent wear resistance.

Further, in the above embodiment, the predetermined length L determined by the inclination angle Φ of the tapered section 70 is set to about 0.2 mm. The length L, however, may vary depending on the performance of the coating machine used and is not particularly limited to the mentioned value so long as the coating layer 66 with a substantially uniform thickness can be simultaneously formed over the individual sections of the piston in the coating step.

It should also be noted that the present invention is applicable to any types of reciprocating fluid machines, such as swash plate compressors with double-headed pistons, wobble plate compressors, expanders and the like.

The invention claimed is:

1. A method of manufacturing a piston for reciprocating in a cylinder bore, comprising the steps of:
    forming, on a lateral surface of the piston, a cylindrical section disposed in sliding contact with the cylinder bore, and tapered sections inclined from the cylindrical section toward an axis of the piston so as to be gradually set apart from the cylinder bore;
    forming a coating layer over the cylindrical section as well as over the tapered sections such that the coating layer coated on each of the tapered sections is gradually set apart from the cylinder bore; and
    cutting part of each of the tapered sections covered with the coating layer inclined so as to be gradually set apart from the cylinder bore, to form a ring groove section to be fitted with a piston ring.

2. The method according to claim 1, wherein the tapered sections are formed by cutting.

3. The method according to claim 1, wherein the tapered sections are formed by forging or press forging.

4. The method according to claim 1, wherein the tapered sections are formed by casting.

* * * * *